(12) United States Patent
Daniell et al.

(10) Patent No.: US 8,783,289 B2
(45) Date of Patent: Jul. 22, 2014

(54) WATER RESERVOIR SHUTOFF

(76) Inventors: Thomas Evan Daniell, Fort Myers, FL (US); Brian Thomas Alexander, Fort Myers, FL (US)

( * ) Notice: Subject to any disclaimer, the term of this patent is extended or adjusted under 35 U.S.C. 154(b) by 24 days.

(21) Appl. No.: 13/361,514

(22) Filed: Jan. 30, 2012

(65) Prior Publication Data

US 2012/0124728 A1 May 24, 2012

Related U.S. Application Data

(63) Continuation-in-part of application No. 12/858,339, filed on Aug. 17, 2010, now abandoned.

(51) Int. Cl.
*F16K 31/48* (2006.01)
*E03D 1/34* (2006.01)

(52) U.S. Cl.
USPC .......................................... 137/624.11; 4/415

(58) Field of Classification Search
CPC ............... E03D 1/36; E03D 1/32; E03D 1/30; F16K 31/48; A01G 25/165
USPC ...................... 137/624.11, 624.12; 4/415, 366
See application file for complete search history.

(56) References Cited

U.S. PATENT DOCUMENTS

| | | | |
|---|---|---|---|
| 1,501,433 A | 7/1924 | Bogard | |
| 2,486,336 A | 10/1949 | Smith | |
| 2,571,367 A | 10/1951 | Judell | |
| 2,657,395 A | 11/1953 | Walker | |
| 2,678,451 A | 5/1954 | Allen, Jr. | |
| 3,046,565 A | 7/1962 | Taylor | |
| 3,086,217 A | 4/1963 | Barlow | |
| 3,324,481 A | 6/1967 | Emerson et al. | |
| 3,365,730 A | 1/1968 | Chiappetta | |
| 3,368,224 A | 2/1968 | Ament | |
| 3,619,821 A | 11/1971 | Bobo | |
| 3,713,558 A | 1/1973 | Pech | |
| 3,733,618 A | 5/1973 | Wiegand | |
| 3,787,902 A | 1/1974 | McCombs | |
| 3,902,201 A | 9/1975 | Bobo | |
| 4,014,050 A | 3/1977 | Goldsworthy | |
| 4,058,858 A | 11/1977 | Che-Wei | |
| 4,064,907 A | 12/1977 | Billington et al. | |
| 4,189,795 A | 2/1980 | Conti et al. | |
| 4,483,367 A | 11/1984 | Ross, Jr. et al. | |
| 4,660,232 A | 4/1987 | Sorensen | |
| 4,903,731 A * | 2/1990 | Pappy ...................... 137/624.11 | |
| 4,916,762 A * | 4/1990 | Shaw ................... 4/366 | |
| 5,125,120 A | 6/1992 | Baron | |
| 5,134,729 A | 8/1992 | Shaw | |
| 5,920,919 A | 7/1999 | Chang | |
| 6,088,846 A | 7/2000 | Baron | |
| 6,321,395 B1 | 11/2001 | Parsons et al. | |
| 7,171,702 B2 | 2/2007 | Shaw | |
| 7,293,583 B2 | 11/2007 | Arigoni | |
| 7,509,973 B1 | 3/2009 | Deive | |

(Continued)

*Primary Examiner* — Kevin Lee
(74) *Attorney, Agent, or Firm* — McHale & Slavin, P.A.

(57) ABSTRACT

A secondary toilet reservoir water shutoff system and method for use in the water tank of a toilet assembly. The secondary toilet reservoir water shutoff having a beneficial use with toilets to prevent the wasting of water in a failing system. The secondary toilet reservoir water shutoff being activated by a toilet flush handle causing rotation of a timing device thereby opening of a secondary valve for a period of time allowing for the passage of water, the time determined by the degree of rotation of the timing device.

7 Claims, 5 Drawing Sheets

(56) References Cited

U.S. PATENT DOCUMENTS

| | | |
|---|---|---|
| 7,617,949 B2 | 11/2009 | Johnson |
| 7,654,281 B2 | 2/2010 | Swindler et al. |
| 8,251,082 B2 * | 8/2012 | Ross et al. .................. 4/378 |
| 8,387,172 B2 * | 3/2013 | Nasrallah .................. 4/415 |
| 2008/0120770 A1 | 5/2008 | Murphy |
| 2012/0012212 A1 | 1/2012 | Daniell et al. |

* cited by examiner

WATER RESERVOIR SHUTOFF

CROSS-REFERENCE TO RELATED APPLICATION

This application is a continuation-in-part of U.S. patent application Ser. No. 12/858,339 filed on Aug. 17, 2010 now abandoned, the contents of which is incorporated herein by reference.

FIELD OF THE INVENTION

The invention relates to toilet water reservoirs and, more particularly, to a secondary water shutoff apparatus and method of use for toilet reservoirs.

BACKGROUND OF THE INVENTION

The failure of toilet flappers to properly seal toilet tanks wastes a tremendous amount of water, often going undetected indefinitely. Water conservation is a critical global obligation, especially when the waste of water is due to flapper valve malfunction. The majority of residential toilets and commercial toilets utilize a flapper valve that is mechanically lifted, releasing water from an elevated reservoir to forcingly move the contents of a toilet bowl into a sewer system. Should the flapper valve malfunction, the flapper allows water to continuously move from the reservoir into the toilet bowl and subsequently flow uncontrolled to the sewer system. The use of the flapper valve is well known it is not a matter of whether the flapper valve will fail, it is a matter of when the flapper valve will fail. The flapper valve is submerged in water at all times and will eventually degrade which results in leakage. If the water is off balance, pH is not neutral; failure of the flapper valve can accelerate.

The basic operation of a conventional toilet has not changed in many years. The conventional toilet flush raises a toilet flapper valve during the flush cycle wherein water stored within the reservoir flows past the flapper valve, draining the contents of the bowl. Once the reservoir is lowered, the flapper valve returns to a normally closed position. Emptying of the reservoir further opens an inlet water valve operated by a float; the lowered water level causes the float to lower resulting in the opening of the inlet water valve for purposes of refilling the reservoir. The water valve stays open until the water flowing into the reservoir lifts the float up causing the inlet water valve to close thereby shutting of the water flow. Depending on the size of the reservoir, it may take a few minutes to fully refill the reservoir. When failure occurs, it is unlikely that the individual who last used the toilet is still in the area. It is possible that the flapper value never returned to position due to valve failure, valve misalignment, or blockage such as when a chain that pulls the flapper valve is wedged in the drain opening. Even if one waits, the inside of a toilet reservoir is not typically visible to the owner or operator.

Moreover, as water enter the reservoir, the weight of the water increases to better seal the flapper valve in an effort to prevent leakage. The flapper valve is the only mechanism employed in a conventional toilet to prevent water from exiting the reservoir. When the flapper valve does not return to a sealed position, the water flowing from the open inlet water valve flows through the reservoir and to the sewer system. A homeowner or business owner may not know of the problem for a period of time, particularly for guest bathrooms that are not operated often. An unsealed flapper in mechanical failure results in large amounts of wasted water, as well as an expensive water bill. Moreover, in this type of failure, an owner may only realize that a failed flapper valve exists when an attempt is made to re-flush the toilet.

In another common failure, the inlet valve or pipe bursts. In this case, the flapper valve may be properly sealed and the reservoir my overflow. Conventional toilets have an elongated conduit proximal to the bottom of the reservoir, the elongated conduit extending vertically allowing for the receipt and passage of water at the distal end. The purpose of the conduit is to prevent water damage to the immediate area should the toilet reservoir continue to fill with water. The conduit protects homeowners and business owners from flooding due to the overflow of water from the reservoir. However, the owner or operator of the toilet may not realize that the water flow is exiting directly to the sewer system because the toilet would continue to flush.

U.S. Pat. No. 6,088,846 and related U.S. Pat. No. 5,125,120 disclose a toilet water regulator which can be mechanically inserted in a flush system to provide variably control of the amount of water that enters a flush operation. The operation is controlled by a cam member in operative mechanical communication a turbine member, the inlet water flow is initiated by a front arm setting of the cam to a high point to set an inlet valve to an open position to establish a water inlet regulation through turbine rotation and an adjustable valve in the outlet and simultaneously setting an outlet valve through the movement of a rear arm and both arms fall away thereby preventing the replenishment of water to a leaking tank.

U.S. Pat. No. 7,293,583 discloses an electronically controlled electro-mechanical device designed to limit a finite amount of water per flush to a tank reservoir. The toilet is flushed, the flush lever activates an attached tilt switch, the tilt switch actuates the countdown timer by means of electrical linkage, and the countdown timer in turn activates the solenoid valve by means of electrical connection. The Countdown timer then resets itself to the time set in memory for the next flush operation.

U.S. Pat. No. 4,058,858 discloses a water storage tank used in a flush toilet is disclosed wherein a timer is provided on the tank for manually adjusting the flush time to automatically control the volume of water required for flush purpose. And the contact area between a closure member and an outlet tube of the tank is made linear to reduce wearing there-between and prevent water leakage.

U.S. Pat. No. 7,509,973 discloses a mechanical timed secondary shut-off valve which is automatically disposed into an initialized configuration upon completion of a normal flush cycle and disposed into a closed configuration in the event of a failed flush cycle.

U.S. Pat. No. 7,654,281 discloses a gauge assembly that includes an indicator for providing an indication of an amount of fluid in a tank and a stop-fill assembly for stopping the flow of fluid flowing into the tank once the fluid reaches a particular level. The gauge assembly has a shaft that rotates as the fluid level changes in the tank. The indicator translates the rotational position of the shaft into a fluid level. The stop-fill assembly moves from an open position, where fluid can flow into the tank, to a closed position, where fluid is prohibited from flowing into the tank, depending on the rotational position of the shaft.

U.S. Pat. No. 4,189,795 discloses an improved ball valve for toilet flush tanks for regulating the quantity of water released from a tank in a flush includes a gauged or adjustable water inlet hole at the bottom of the ball valve and an air bleed hole at the top of the ball valve. The water inlet hole at the bottom of the ball valve is adjustable in size for selectively setting the flow rate of water entering the ball valve during a flush action, and thereby determining the time the ball valve remains open to allow flush water to drain from the tank.

U.S. Pat. No. 6,321,395 discloses by depressing a push button (42), a toilet user opens a valve (44) that permits pressure holding a flush valve (12) seated to be exhausted through a pressure-relief line (48). The pressure in the flow path by which liquid thereby leaves the outlet (46) of the remote valve (44) tends to hold that remote valve's valve member (100) open after the user releases the push button (42). But pressure from the pressure-relief line (48) slowly builds up in a seating-pressure chamber (110) by fluid flow through a high-flow-resistance path provided by a passage containing a fluted pin (114). After a resultant delay sufficient to permit the toilet's tank (16) to empty through the outlet (22) controlled by the flush valve (12), the pressure within the seating-pressure chamber (80) reaches a point at which the force exerted by it on the valve member (110) exceeds the flow-path-pressure force tending to keep that valve member unseated. The remote valve (44) therefore closes and as a result causes the flush valve to close.

U.S. Pat. No. 3,733,618 discloses a water saver attachment for toilet tank flush valves is presented. The attachment includes an automatic one-way vent valve mounted in an opening through the wall of the flush valve. The vent valve may be preset to control the rate of flow therethrough. As the buoyant flush valve vents water replaces the vented air to decrease the buoyancy of the valve causing it to close before all water has drained from the tank. The rate of flow through the vent then is proportional to the amount of water retained in the tank when the flush valve closes.

U.S. Pat. No. 5,920,919 discloses a toilet system which minimizes water usage, provides improved flushing, includes a water volume control device and provides flushing when the supply water pressure is below desired levels. The toilet system includes a source of water, a feed valve which is opened by an flush activation device and closes when the water supply flow rate falls below a predetermined flow rate. The toilet system also includes a sealed flush tank with a water volume control for pre-setting the desired water volume, and a flush valve which is activated when the flow rate of supply water falls below a pre-determined minimum level.

U.S. Publication No. 2008/0120770 discloses a water-conserving blowout toilet (10) includes a valve (14), such as a globe valve, connected to a timing mechanism (16) for determining a volume of water flowing to a toilet bowl (32) independent of water flow, a bowl (32) having a lower portion (36) defining a volume of space such that a minimal amount of the water is sufficient to cover and seal a waste outlet (34), and a distribution manifold (22) for distributing the water into the bowl (32) for maximum effect.

U.S. Pat. No. 4,014,050 discloses an apparatus for controlling the quantity of water flowing through a water outlet in the tank of a toilet comprising a timer including a rotatable output shaft, the timer being responsive to the angular rotation of the shaft from an initial position and operative to return the shaft to the initial position after a time duration corresponding to the amount of angular rotation of the shaft, a crank coupled to the shaft and being capable of rotating the shaft through a predetermined angle when a force is applied to it, a mounting assembly for mounting the timer to the tank, and a mechanical linkage coupled between the shaft and a lift rod in the tank for moving the lift rod a dimension such that a valve is unseated when the shaft is not in the initial position, and the valve is seated when the shaft is in the initial position, whereby when a force applied to the crank rotates the angle the linkage is moved a dimension sufficient to unseat the valve from the water outlet causing water to flow through the water outlet, and whereby the return of the shaft to said initial position causes the linkage to seat the valve on the water outlet after a time duration corresponding to the predetermined angle, the time duration serving to control the quantity of water flowing out of the tank.

U.S. Pat. No. 3,787,902 discloses the volume of water supplied to flush a toilet bowl is selected by setting a handle mounted externally on a flush tank, which handle swings a support lever between a nonlimiting position and a position for limiting downward travel of an auxiliary float. A float-actuated lever carries adjacent to its pivot a link for engaging the flush tank discharge valve to limit upward travel of such valve. The valve thereby remains close to its valve seat so that the valve is closed more quickly by pressure of the water on its upper surface and suction created by water flowing through the valve port, thereby substantially reducing the volume of water supplied to the bowl.

U.S. Pat. No. 3,902,201 discloses a control which may be used for the filling of a flush tank of a commode, depending upon the amount of fluid passing through a fluid flow controlling device including a housing containing a turbine wheel. The control includes a valve actuating cam surface which is driven, through a reducer mechanism, by the rotation of the turbine wheel. The rotation of the turbine wheel is caused by the flow of fluid past the turbine wheel. After flowing past the turbine wheel, the fluid flows into a flush tank and commode. The relationship between the turbine wheel and the valve actuating cam surface is such that after a predetermined amount of fluid flows past the turbine wheel, the cam surface is rotated so as to cause the inlet valve to close.

U.S. Pat. No. 3,619,821 discloses a control for the filling of a flush tank for a commode depending on the weight of a proportionate part of the water flowing into the flush tank. The control includes a three-way valve allowing water, when the valve is open, to flow into three separate conduits. One conduit leads to the flush tank, one to the commode, and the third to a relatively small auxiliary weight tank. The valve has its control stem connected to and operated by the relatively small auxiliary weight tank (which is sometimes herein designated as a water weight control box) into which a relatively small proportion of the water flowing through the valve flows. The amount of water flowing through the third conduit is controlled by a needle valve.

U.S. Pat. No. 3,713,558 discloses a liquid metering and dispensing attachment for dispensing given amounts of fluid when the unit price varies. The amount of flow in value as measured in dollars and cents is translated into degrees of rotation by means of an extensible and retractable computing means. The flow of liquid through the device spins a turbine and the amount of liquid dispensed is also translated thereby into degrees of rotation. When the two are equal, a snap action valve is released thereby shutting off the flow of liquid.

U.S. Pat. No. 7,617,949 discloses a turbine wheel and gear system rotate an output shaft in response to flow, where the output shaft is connected to a clutch cup that engages a clutch and valve disk. The disk cooperates with a valve seat formed on a piston to permit/prevent flow within the piston. During flow, the clutch clamps to the disk, and the piston and disk move downstream until an associated control member hits a stop, opening the valve (as the disk stops), while the piston continues downstream. The clutch rotates the disk and control member, and if a maximum flow volume occurs, the control member rotates to an interrupt position and is released from the stop, closing the valve. Passages allow restricted flow to disengage the clutch and permit a spring to move the piston and valve upstream until engaging a reset cam that rotates the control member back to an initial position.

U.S. Pat. No. 5,125,120 discloses a toilet water regulator device which prohibits water flow into the toilet system after a predetermined amount of water has entered the system comprising a valve at the water inlet to the system, said valve having a water outlet to the system, wherein the flow of water through said valve is controlled by turbine means associated with the water outlet of the valve and the amount of water predetermined necessary to fill the tank is controlled by adjustable valve means.

U.S. Pat. No. 5,134,729 discloses a device for metering the flow of water into the tank and bowl of any currently known tank toilet and providing a positive shut-off of the flow. When the toilet handle is turned, a linkage rotates a cam to force a stopper from its seat thereby commencing water flow. Water flows through a flow channel to be directed by a flow nozzle past a water wheel imparting a rotation thereto. The water wheel is gearably linked to the cam thereby rotating the cam. When the cam has rotated to position a cam repeat over the stopper stem, the stopper is reseated by the pressure of the water and water flow ceases. The distribution of flowing water between tank and bowl can be changed by altering the structure of a bowl fill assembly. The bowl fill assembly and a tank fill tube are attached to the outlet by a right angle manifold. The amount of water flow permitted is a function of the number of cam notches and flow nozzle size.

U.S. Pat. No. 7,171,702 discloses a metered water control system inlet tube (24) receiving water conducting water into the interior of the tank to a diverter. A diverter (48) channels the flow to cause mechanical motion responsive to the channeled flow. A control valve (66 and 60), responsive to a mechanical switch, opens and closes access of the water from the inlet tube to the diverter. A mechanical switch (124, 112, and 114), responsive to flow of water from the diverter, closes the control valve automatically when a predeterminable volume of water flows through the diverter. A discharge tube (20 and 24) receives water from the diverter to discharge the water into the tank. An actuator (158 and 162) linked to a flush arm of the toilet and linked to the mechanical switch causes the switch to open the control valve to allow the pre-determined volume of water to flow into the discharge tube.

Accordingly, a need exists to provide a back-up to the conventional flapper valve shutoff and, more particularly, to a system and method that provides a safety control for water before it enters the toilet reservoir.

SUMMARY OF THE INVENTION

The present invention provides a system and method for a secondary toilet reservoir water shutoff for water conservation. According to one aspect of the present invention, a mechanical water timer is provided for toilet reservoir water shutoff providing a timing device to automatically shut off the flow of water based on an 'x' amount of time, where 'x' is determined by the amount rotation of the timing mechanism. Once the water shuts off, an operator may again open the valve.

It is an objective of the instant invention to provide a water timer that preferably shall be rotated counter clockwise relative to the timer body.

It is yet another objective of the instant invention to provide a disc with a notch, the disc formed or secured about a rotating timing device, the notch allowing an elongated pin to movingly enter the notch cavity, the elongated pin secured at a proximal end to a plunger valve, a spring exerting downward force against the plunger towards the notch cavity causing a sealing engagement of the plunger valve against a conduit when the notch is aligned with the elongated pin.

It is a still further objective of the instant invention to provide a conduit for the flow of water when a timing valve is open.

It is a still further objective of the instant invention to provide a completed kit for releasing water into a toilet reservoir.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
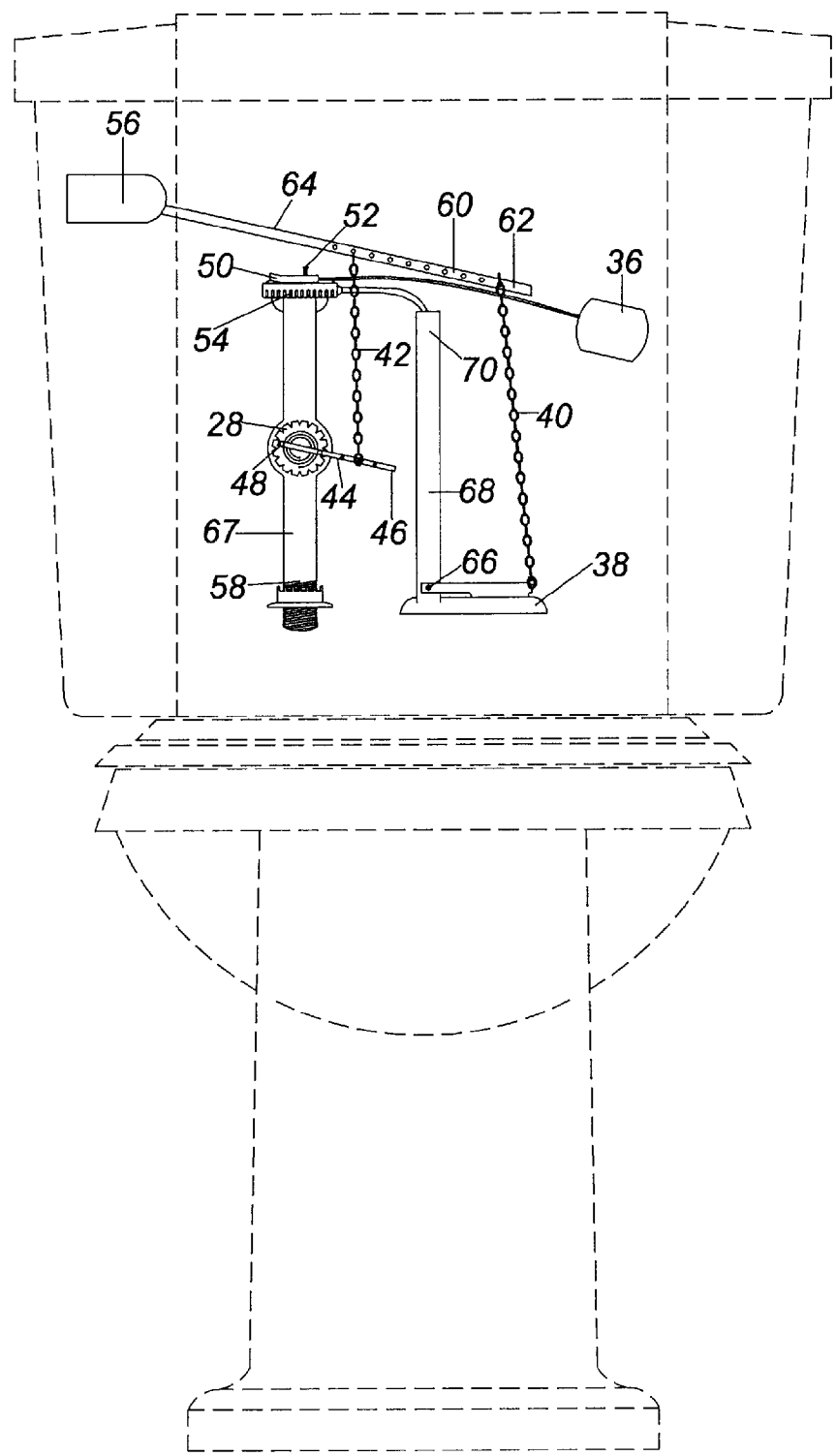
FIG. 1 is a side perspective view of the toilet water shutoff kit.
Figure 2:
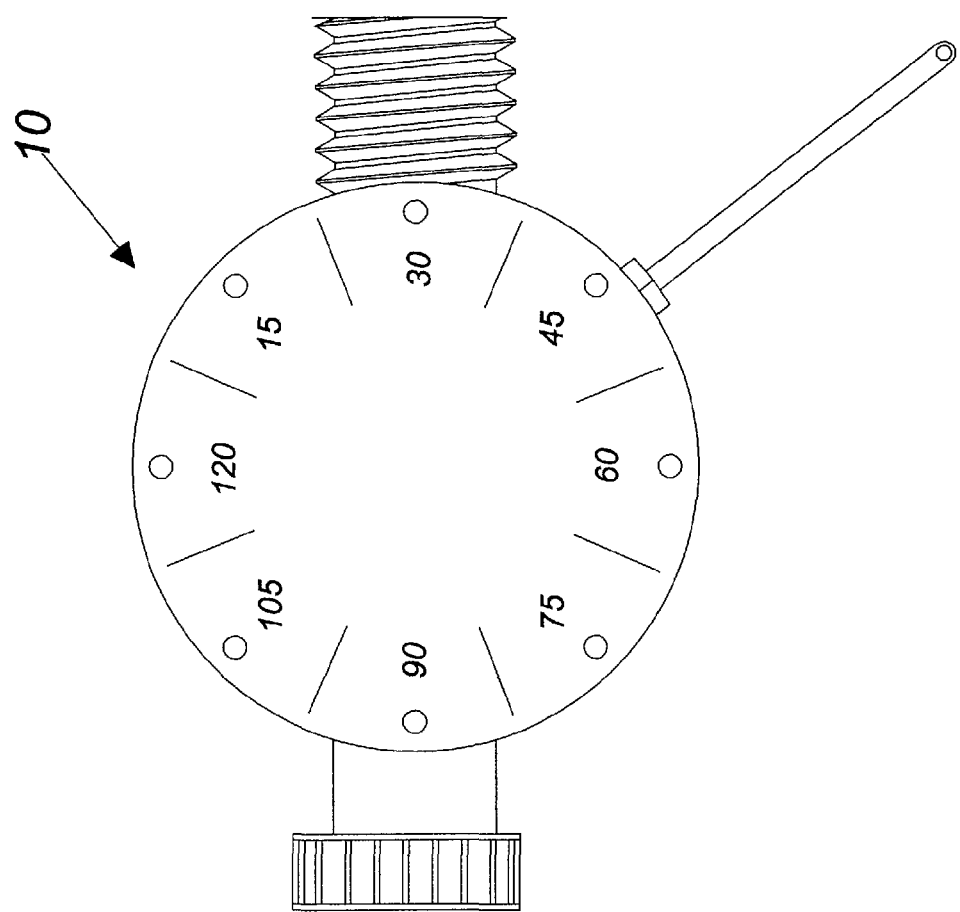
FIG. 2 is a side view of the timing mechanism.
Figure 3:
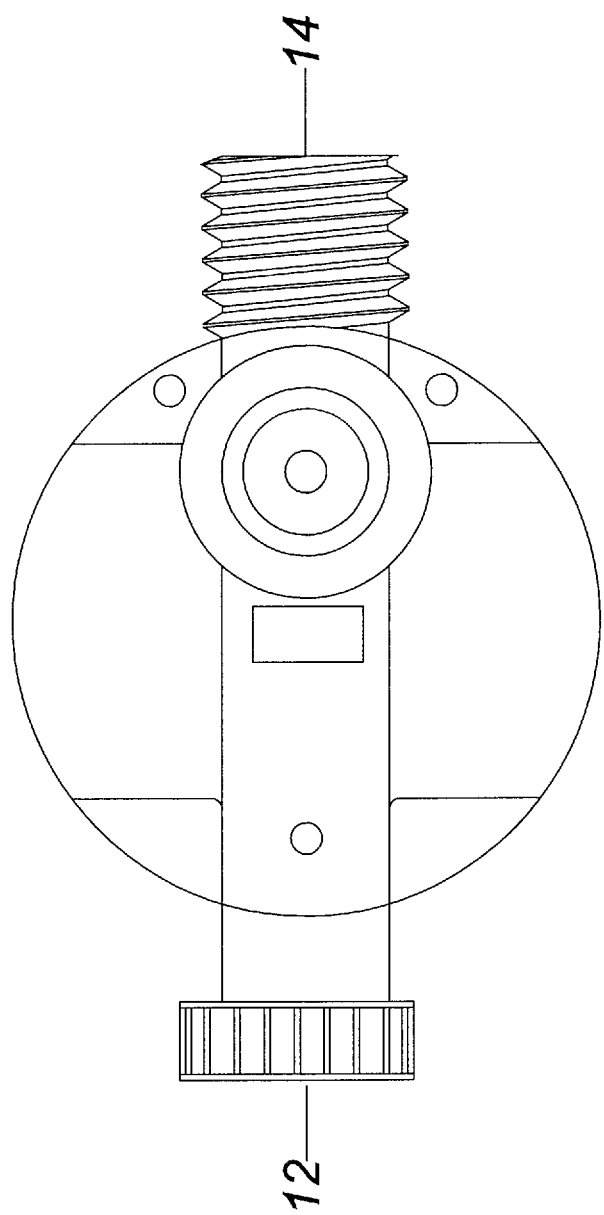
FIG. 3 is a side view opposite of FIG. 2 of the timing mechanism.
Figure 4:
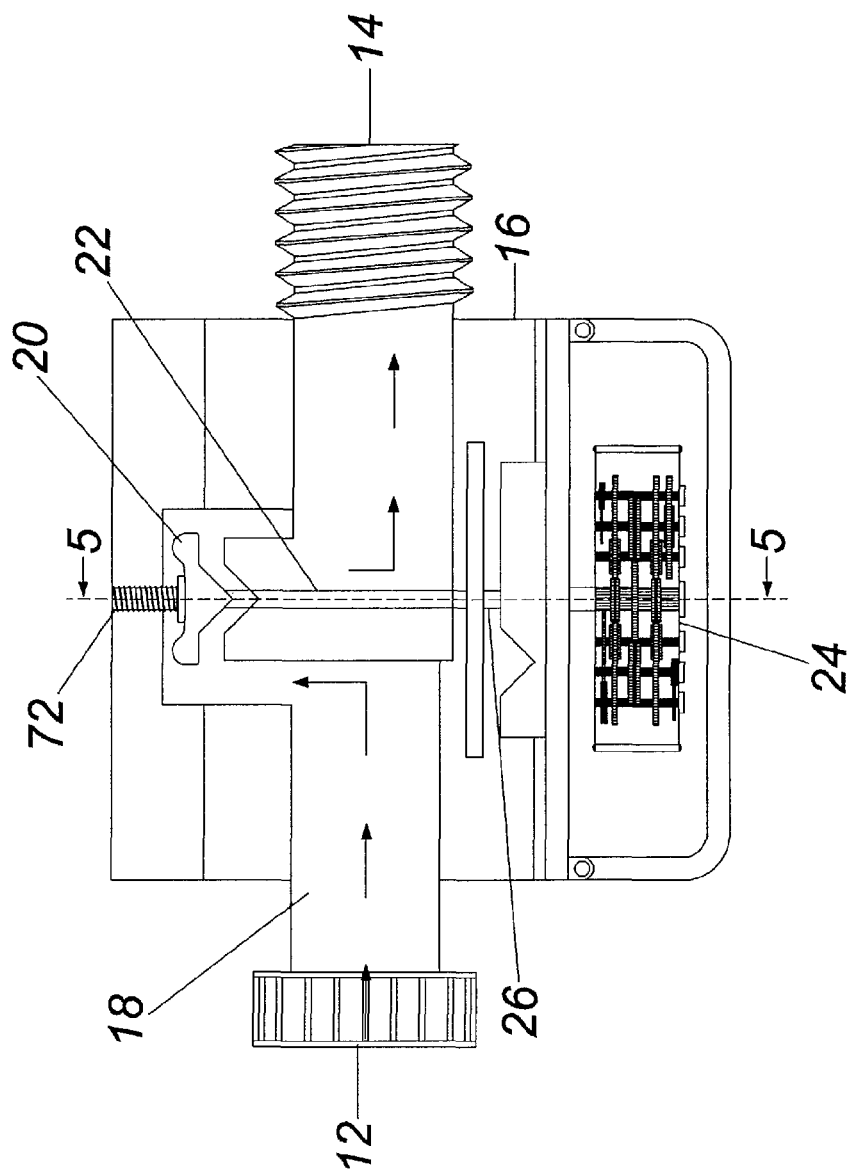
FIG. 4 is a cross-sectional side view of the timing mechanism.

Referring now to FIG. 1, an embodiment of a toilet water system and method of use comprising a flush handle 56 situated outside of the toilet reservoir, the flush handle allows for an operator to engage the handle 56 causing the release of water into a toilet reservoir. The flush handle is connected to first arm 60, capable of moving when an operator engages the flush handle 56. A toilet flapper 38 capable of hingedly opening and closing, closing of the toilet flapper may cause a sealing fit, preferably the toilet flapper will not allow the passage of water until intentionally activated. A mechanical connection 40 exists between the toilet flapper 38 and the first arm 60. The connection may formed from a chain, flexible line, or similar connection capable of placing vertical force on the toilet flapper 38 when an operator engages the flush handle 56. Once a toilet reservoir has emptied, the toilet flapper 38 may hingedly return to the closed position. Emptying of the reservoir allows a toilet reservoir float 36 to hingedly fall, resulting in the opening of a valve 52. The opening of the valve 52 allows water to refill the reservoir. The valve 52 stays open until the water flowing into the reservoir lifts the float 36 causing the water valve 52 to close and shutting of the water flow, taking upward from a few seconds to a few minutes to fully fill the tank. Moreover, as water enters the reservoir, the weight of the water increases, the flapper 38 is typically sealed tighter against the reservoir preventing leakage, though sealing does not always occur.

An elongated conduit 68 proximal 66 to the bottom 70 of the reservoir, the elongated conduit 68 extending vertically allowing for the receipt and passage of water at the distal end 70. The purpose of the conduit is to allow for the disposal of water when the toilet reservoir continues to fill with water. The conduit protects homeowners and business owners of flooding resulting from the overflow of water from the reservoir. The owner or operator of the toilet would not be alarmed to the water flow overflow exiting the conduit to the sewer system because the toilet would continue to flush.

A second elongated conduit 67 having a proximal end 58 securable to the bottom 70 of the reservoir for receiving water passage therethrough, the second elongated conduit 67 extending vertically allowing the dispensing of water at a distal end 54. The second elongated conduit 67 is preferably made from PVC plastic. In one preferred embodiment, the proximal end 58 is constructed with a threaded end about the outside wall. In another preferred embodiment, the proximal end 58 is constructed with a threaded end about the inside of the wall. In a preferred embodiment, the distal end 54 constructed having a threaded end about the outside wall. In another preferred embodiment, the distal end 54 having a threaded end about the inside wall. At a point about the second elongated conduit 67 exists a secondary toilet reservoir shutoff 10.

The shutoff 10 is based on a timer design. The secondary toilet reservoir shutoff prevents the flow of water when time 'x' equals zero. The shutoff 10 is formed having a timing arm 44. A mechanical connection 42 exists between the timing arm and the first arm 60.

Figure 5:
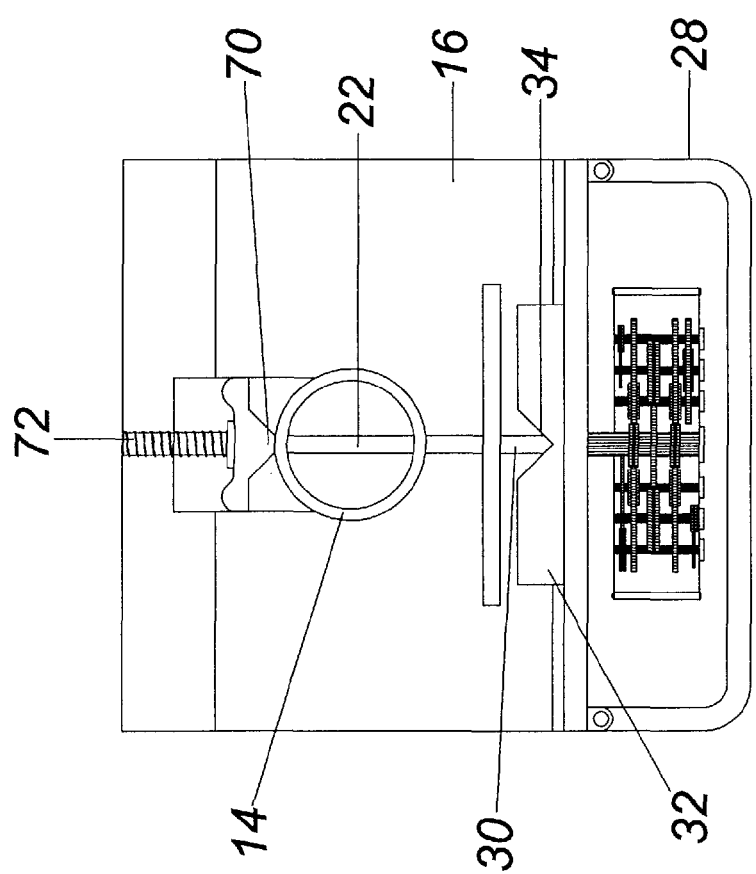
FIG. 5 is a cross-sectional view of the timing mechanism of FIG. 4 taken along the line 5-5.

Operator activation and engagement of the flush handle 56 increases the time 'x' that water may flowingly pass through the secondary toilet reservoir shutoff 10. In one embodiment, increasing 'x' means the turning of the rotating timing device 28. Preferably, the timing mechanism shall be turned counter-clockwise. The timer is composed of a disc 32 with a notch 34 and a gear assemblage 24, the disc 32 formed or secured about a rotating timing device, the notch 34 allowing an elongated pin 22 to movingly enter the notch cavity 34 at the distal end 30 of the elongated pin 22, seen in FIG. 5, the elongated pin secured at a proximal end 70 to a plunger valve 20, a spring 72 exerting downward force against the plunger towards the notch cavity causing a sealing engagement of the plunger valve against a conduit when the notch is aligned with the elongated pin.

Activation of the flush handle 56 causes, for 'x' amount of time, an intentional misalignment of the notch with the elongated pin 22. The misalignment forces the elongated pin to move away from the notch. The result of the elongated pin movement in relation to the notch causes the opening of the plunger valve 20 for time 'x', where 'x' is determined by the rotational displacement of the rotating timing device 28. Subsequent to the opening of the plunger valve, water shall flow through the secondary toilet water reservoir shutoff 10.

When 'x' equals zero, the timing mechanism closes, thereby closing the plunger 20. Activating the flush handle 56 increases time 'x' and allows the passage of water to the toilet reservoir.

In one preferred embodiment, the rotating timing device 28 has a gear and spring system. After rotation of the rotating timing device 28, the gear and spring system moves the rotating timing device 28 to the starting position where 'x' shall equal zero.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A secondary toilet reservoir water shutoff comprising: a housing having an inlet and an outlet, said housing including a conduit configured to permit passage of water from said inlet through said outlet; a shutoff valve positioned between said inlet and said outlet; a timer coupled to said shutoff valve, operation of said timer opening said shutoff valve for a length of time 'x', said timer including a timing arm coupled to a handle flush arm; wherein the rotation of said handle flush arm rotates said timer counter-clockwise to open and to permit the flow of water through said conduit, and said timer mechanically rotates clockwise to return to a closed position over length of time 'x'.

2. The secondary toilet reservoir water shutoff of claim 1 wherein said conduit includes an outer wall and an inner wall, having a proximal end constructed for cooperatively engaging the inside wall of a toilet reservoir.

3. The secondary toilet reservoir water shutoff of claim 2 wherein said proximal end includes threading about one of said outer wall and said inner wall.

4. A secondary toilet reservoir water shutoff of claim 1 wherein said length of time 'x' is defined where 'x' equals the range between fifteen seconds and two minutes (15 sec<x<120 sec).

5. A secondary toilet reservoir water shutoff of claim 1 wherein said timer cannot be bypassed.

6. A secondary toilet reservoir water shutoff of claim 1 wherein varying the point of coupling along a length of said timing arm will influence said length of time 'x' for permitting the flow of water through said conduit.

7. A secondary toilet reservoir water shutoff of claim 1 wherein varying the point of coupling along a length of said handle flush arm will influence said length of time 'x' for permitting the flow of water through said conduit.

* * * * *